W. B. Ellis.

Mosquito Canopy.

N° 87,164. Patented Feb. 23, 1869.

Witnesses:
Robert D. Gay
William G. Baker

Inventor:
Warren B. Ellis

United States Patent Office.

WARREN B. ELLIS, OF BOSTON, MASSACHUSETTS.

Letters Patent No. 87,154, dated February 23, 1869.

---

IMPROVED MOSQUITO-CANOPY FOR BEDS.

---

The Schedule referred to in these Letters Patent and making part of the same.

---

*To all whom it may concern:*

Be it known that I, WARREN B. ELLIS, of Boston, in the county of Suffolk, in the State of Massachusetts, have made a new and useful Invention in the Arrangement of Mosquito-Canopies for Beds; and I do hereby declare that the following is a full and exact description thereof, reference being had to the accompanying drawings, making a part of this specification, in which—

Figure 1:
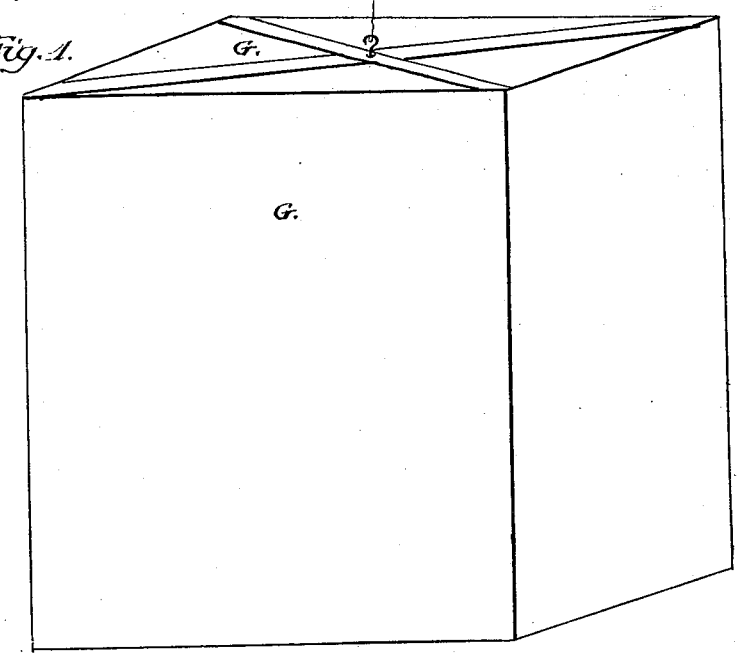
Figure 1 represents the canopy opened and suspended from the ceiling.
Figure 2:
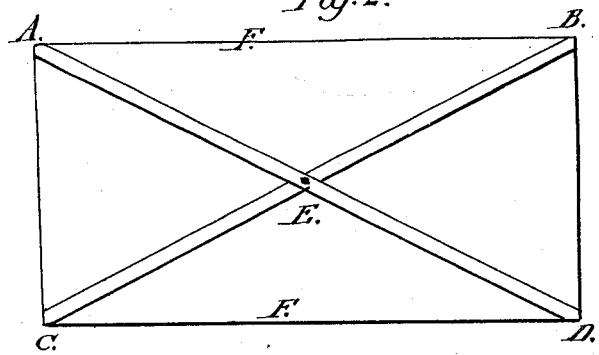
Figure 2 represents frame of canopy.
Figure 3:
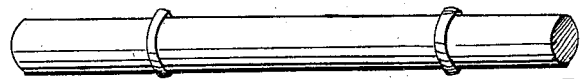
Figure 3 represents the canopy closed.

The point of invention is the swinging of the wooden strips A B on the pivot E, and the use of the elastic cords F, to connect the bars at A B and C D, on which the lace G of the top and sides is gathered.

The use of the elastic cords is to keep the canopy opened when suspended from the ceiling.

The swinging of the wooden strips on the pivot E is to allow of the canopy being closely packed for transportation.

I do not claim the invention of cross-bars for the canopy-top, as that is old; but

What I claim, and desire to secure by Letters Patent, is—

The combination of the strips A B with the pivot and hook E, and the elastic cords F, as and for the purpose specified.

WARREN B. ELLIS.

Witnesses:
EDWARD A. HUNTING,
P. W. FORD.